United States Patent
Alakuijala et al.

(10) Patent No.: US 11,228,786 B2
(45) Date of Patent: Jan. 18, 2022

(54) COMPRESSING FRAME BASED ON ERRORS OF PREVIOUS FRAMES

(71) Applicant: Google LLC, Mountain View, CA (US)

(72) Inventors: Jyrki Antero Alakuijala, Wollerau (CH); Luca Versari, Zurich (CH)

(73) Assignee: Google LLC, Mountain View, CA (US)

(*) Notice: Subject to any disclaimer, the term of this patent is extended or adjusted under 35 U.S.C. 154(b) by 37 days.

(21) Appl. No.: 16/707,736

(22) Filed: Dec. 9, 2019

(65) Prior Publication Data

US 2021/0014532 A1  Jan. 14, 2021

Related U.S. Application Data

(60) Provisional application No. 62/873,040, filed on Jul. 11, 2019.

(51) Int. Cl.
  *H04N 19/137* (2014.01)
  *H04N 19/159* (2014.01)
  (Continued)

(52) U.S. Cl.
  CPC .......... *H04N 19/61* (2014.11); *H04N 19/107* (2014.11); *H04N 19/124* (2014.11);
  (Continued)

(58) Field of Classification Search
  CPC .... H04N 19/124; H04N 19/147; H04N 19/61; H04N 19/154; H04N 19/172
  See application file for complete search history.

(56) References Cited

U.S. PATENT DOCUMENTS 6,529,631 B1   3/2003  Peterson et al.
8,204,323 B2 *  6/2012  Tzannes .................... G06T 9/00
                                                    382/239

(Continued)

FOREIGN PATENT DOCUMENTS

EP    2658258 A2   10/2013
WO    9943161 A1    8/1999
WO  2004109586 A1  12/2004

OTHER PUBLICATIONS

Extended European Search Report for European Application No. 20182393.7, dated Dec. 15, 2020, 7 pages.

(Continued)

Primary Examiner — Kyle M Lotfi
(74) Attorney, Agent, or Firm — Brake Hughes Bellermann LLP

(57) ABSTRACT

A method can include compressing a first original frame of a video stream to an intraframe, the intraframe comprising fewer symbols than the first original frame, compressing a second original frame to a first interframe, the first interframe referencing the intraframe and comprising fewer symbols than the second original frame, determining an intraframe error of the intraframe due to the compression of the first original frame, determining a first interframe error of the first interframe due to the compression of the second original frame, determining a compression level for a third original frame based on the intraframe error and the first interframe error, and compressing the third original frame to a second interframe, the second interframe referencing the intraframe and the first interframe and comprising fewer symbols than the third original frame, a number of symbols included in the second interframe being based on the determined compression level.

20 Claims, 6 Drawing Sheets

(51) Int. Cl.
*H04N 19/172* (2014.01)
*H04N 19/124* (2014.01)
*H04N 19/176* (2014.01)
*H04N 19/61* (2014.01)
*H04N 19/107* (2014.01)

(52) U.S. Cl.
CPC ......... *H04N 19/137* (2014.11); *H04N 19/159* (2014.11); *H04N 19/172* (2014.11); *H04N 19/176* (2014.11)

(56) References Cited

U.S. PATENT DOCUMENTS

| | | | | |
|---|---|---|---|---|
| 9,036,699 | B2* | 5/2015 | Vafin | H04N 19/176 375/240.03 |
| 2010/0111198 | A1* | 5/2010 | Lakus-Becker | H04N 19/647 375/240.27 |
| 2013/0279567 | A1* | 10/2013 | Brailovskiy | H04N 19/154 375/240.03 |
| 2015/0130965 | A1 | 5/2015 | Oishi | |

OTHER PUBLICATIONS

"Butteraugli estimates the psychovisual difference between two images", Retrieved on Jul. 18, 2019 from https://github.com/google/butteraugli, 2 pages.

"Structural Similarity", Wikipedia, retrieved on Jul. 18, 2019 from https://en.wikipedia.org/wiki/Structural_similarity, Jul. 4, 2019, 7 pages.

Ernawan, et al., "Integrating a Smooth Psychovisual Threshold into an Adaptive JPEG Image Compression", Journal of Computers, vol. 9, No. 3, Mar. 2014, pp. 644-653.

* cited by examiner

COMPRESSING FRAME BASED ON ERRORS OF PREVIOUS FRAMES

CROSS-REFERENCE TO RELATED APPLICATION

This application is a non-provisional of, and claims the benefit of priority to, U.S. Provisional Application No. 62/873,040, filed on Jul. 11, 2019, entitled, "COMPRESSING FRAME BASED ON ERRORS OF PREVIOUS FRAMES," the disclosure of which is hereby incorporated by reference.

TECHNICAL FIELD

This description relates to video compression.

BACKGROUND

In video compression, intraframes can store a complete image. Interframes can reduce data required to store the image by storing changes in the image from other frames that are referenced by the interframes, rather than the complete image.

SUMMARY

A method can include compressing a first original frame of a video stream to an intraframe, the intraframe comprising fewer symbols than the first original frame, compressing a second original frame of the video stream to a first interframe, the first interframe referencing the intraframe and comprising fewer symbols than the second original frame, determining an intraframe error of the intraframe due to the compression of the first original frame, determining a first interframe error of the first interframe due to the compression of the second original frame, determining a compression level for a third original frame based on the intraframe error and the first interframe error, and compressing the third original frame of the video stream to a second interframe, the second interframe referencing the first interframe and comprising fewer symbols than the third original frame, a number of symbols included in the second interframe being based on the determined compression level.

A non-transitory computer-readable storage medium can include instructions stored thereon that, when executed by at least one processor, are configured to cause a computing system to compress a first original frame of a video stream to an intraframe, the intraframe comprising fewer symbols than the first original frame, compress a second original frame of the video stream to a first interframe, the first interframe referencing the intraframe and comprising fewer symbols than the second original frame, determine an intraframe error of the intraframe due to the compression of the first original frame, determine a first interframe error of the first interframe due to the compression of the second original frame, determine a compression level for a third original frame based on the intraframe error and the first interframe error, and compress the third original frame of the video stream to a second interframe, the second interframe referencing the first interframe and comprising fewer symbols than the third original frame, a number of symbols included in the second interframe being based on the determined compression level.

A computing system can include at least one processor and a non-transitory computer-readable storage medium. The non-transitory computer-readable storage medium can include instructions stored thereon that, when executed by at least one processor, are configured to cause a computing system to compress a first original frame of a video stream to an intraframe, the intraframe comprising fewer symbols than the first original frame, compress a second original frame of the video stream to a first interframe, the first interframe referencing the intraframe and comprising fewer symbols than the second original frame, determine an intraframe error of the intraframe due to the compression of the first original frame, determine a first interframe error of the first interframe due to the compression of the second original frame, determine a compression level for a third original frame based on the intraframe error and the first interframe error, and compress the third original frame of the video stream to a second interframe, the second interframe referencing the first interframe and comprising fewer symbols than the third original frame, a number of symbols included in the second interframe being based on the determined compression level.

The details of one or more implementations are set forth in the accompanying drawings and the description below. Other features will be apparent from the description and drawings, and from the claims.

DETAILED DESCRIPTION

In video compression, values stored within frames, which represent sequentially-displayed pictures or images, can be quantized. Quantization is a lossy compression technique that compresses a range of values to a single quantum value, such as by rounding the values or ignoring one or more least significant digits, reducing the number of symbols required to represent a frame. The compression can introduce error into the representations of the frames.

Also, in video compression using delta encoding, intra-coded picture frames (I-frames) can store a complete image, and/or not reference any other frames. Predicted picture frames, or P-frames, which can be considered interframes, store only changes in the image from a previous frame, which can be an intraframe or another interframe, and can implicitly or explicitly reference the other frame from which the changes are stored, reducing the data required to store the image. Bidirectional predicted frames (B-frames) can reduce data further by storing differences between the current frame and both preceding and following frames (such as the immediately preceding frame and the immediately following frame), and can implicitly or explicitly reference the frames of which the B-frame stores the difference.

A technical problem with compressing video using both quantization and delta encoding, such as interframes that store changes from other frames, is that errors due to quantization can accumulate. For example, if quantization causes a value stored in an I-frame to be too high, and quantization causes the corresponding value stored in a P-frame or B-frame that references the I-frame to also be too high, then the errors due to quantization or compression of the values will accumulate and/or add together, increasing the error of the interframe compared to the original frame representing the original image. A technical solution to this technical problem is to compress frames based on errors of previous frames. Compressing frames based on errors of previous frames can include determining quantization levels and/or compression levels of P-frames or B-frames based on errors in the previously encoded frames, such as frames that are referenced by the P-frames or B-frames or from which the P-frames or B-frames store changes. If the errors in the previously encoded frames are too high, then the quantization level and/or compression level can be reduced, using more symbols to represent the current frame, to reduce the error. This technical solution provides a technical benefit of saving data by compressing video using both quantization and delta encoding, while keeping the errors of the compressed video within a tolerable error level.

Figure 1:
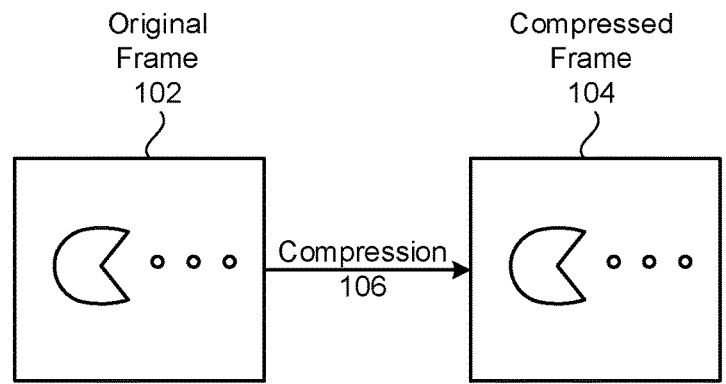
FIG. 1 shows an original frame and a compressed frame.

FIG. 1 shows an original frame 102 and a compressed frame 104. The original frame 102 and/or the compressed frame 104 can represent an image or picture according to any imaging format, such as Tagged Image File Format (TIFF), Joint Photographic Experts Group (JPEG), Graphic Interchange Format (GIF), or Portable Network Graphics (PNG). The compressed frame 104 compresses the image data stored by the original frame 102. The compressed frame 104 can represent an I-frame that does not reference any other frames, or an interframe, such as a P-frame or a B-frame, which does reference one or more other frames.

The original frame 102 and the compressed frame 104 represent the same image or picture. In this example, the image or picture is a circle or pie with a wedge removed and three dots. The image or picture can be presented on a display or monitor of a computer system.

A computing system, which may or may not be the same computing system that presented the image or picture, can perform a compression 106 function on the original frame 102 to generate the compressed frame 104. The compression 106 of the original frame 102 to generate the compressed frame 104 and can cause the compressed frame 104 to include fewer symbols than the original frame 102, saving data. In some examples, the compression and reduction in symbols can be due to quantization, or using fewer symbols to represent values within the compressed frame 104, such as by rounding values. Rounding can cause values in the compressed frame 104 to be close, but not identical, to values in the original frame 102. In some examples, the compression and reduction in symbols can be due to delta encoding, or referencing a previously encoded frame(s) and storing changes from the previously encoded frame(s). Delta encoding can cause the compressed frame 104 to inherit errors of the frame(s) that the compressed frame 104 references and/or stores changes from.

The image represented by the compressed frame 104 can, due to the compression, be different than the image represented by the original frame 102. The difference between the compressed frame 104 and the original frame 102 can be considered an error due to compression and/or quantization. The difference between the original frame 102 and the compressed frame due to the error may or may not be noticeable to a human user, and/or may or may not be within a tolerable error.

Figure 2:
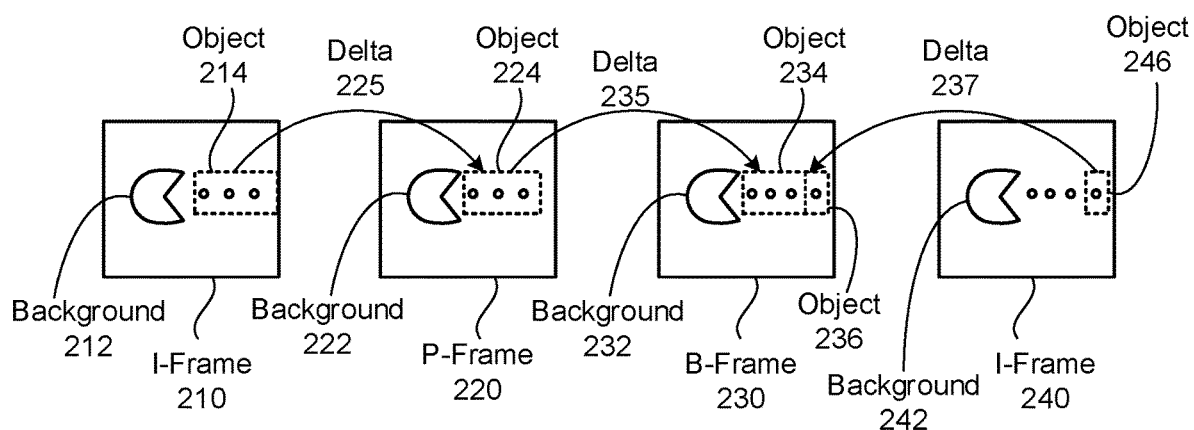
FIG. 2 shows two intra-coded picture frames, a predicted picture frame, and a bidirectional predicted picture frame.

FIG. 2 shows two intra-coded picture frames (I-frames) 210, 240, a predicted picture frame (P-frame) 220, and a bidirectional predicted picture frame (B-frame) 230. The frames 210, 220, 230, 240 are shown sequentially from left to right within a video and/or animation. In this example, all of the frames 210, 220, 230, 240 can share a background object 212, 222, 232, 242 which is common to all of the frames 210, 220, 230, 240, and/or which does not change for successive frames 210, 220, 230, 240. Any, or all, of the frames 210, 220, 230, 240 can be compressed and/or quantized versions of original frames, with any combination of features of the compressed frame 104 described above. In some examples, the I-frame 210 can be considered a first intraframe, compressed from a first original frame by quantization but not delta encoding. In some examples, the P-frame 220 can be considered a first interframe, compressed from a second original frame by quantization and delta encoding. In some examples, the B-frame 230 can be considered a second interframe, compressed from a third original frame by quantization and delta encoding. In some examples, the I-frame 240 can be considered a second intraframe, compressed from a fourth original frame by quantization but not delta encoding.

The I-frames 210, 240 can store data representing a complete picture or image. The I-frame 210 can include an object 214, such as three dots in the example of FIG. 2, that moves in successive frames. The P-frame 220 can reference the I-frame 210 preceding the P-frame 220 either by an explicit reference to the I-frame, or implicitly based on a protocol that a frame immediately after an I-frame will reference the immediately preceding I-frame.

The P-frame 220 can include an object 224, such as three dots in the example of FIG. 2, corresponding to the object 214 in the I-frame 210 that the P-frame 220 references. A location of the object 224 can change in the P-frame 220 compared to the location of the object 214 in the I-frame 210. The change in location of the object 224 can be considered a delta 225. The P-frame 220 can reference the I-frame 210 explicitly by a stored reference identifier, or implicitly based on a protocol that specific frames in a sequence refer to other specific frames in the sequence. The P-frame 220 can store the delta 225 to the location of the object 224, compared to the I-frame 210, without storing a description of the background 222 or the object 224, thereby saving data. However, if quantization of the location of the object 214 in the I-frame 210 causes an error, such as locating the object 214 to the left of the location of the object in the original frame, and quantization of the delta 225 causes a similar error, such as moving the object 224 even farther to the left, then the errors can accumulate, causing the object 224 to be located even farther to the left from the location in the second original frame than the errors from encoding either the first original frame or second individual frame would cause individually.

The B-frame 230 can also include an object 234 corresponding to the objects 214, 224 of the I-frame 210 and P-frame 220. The object 234 may have changed locations, such as moving to the left, compared to the location of the object 224 in the P-frame 220. The change in location of the object 234 compared to the location of the object 224 in the P-frame 220 can be represented by a delta 235. The B-frame 230 can store the delta 235, without storing a description of the background 232 or object 234, saving data. The B-frame 230 can reference the P-frame 220 explicitly by a stored reference identifier, or implicitly based on a protocol that specific frames in a sequence refer to other specific frames in the sequence.

The I-frame 240, which represents a picture or image that comes after the B-frame in time, can include an object 246, such as a fourth dot in the example shown in FIG. 2. The I-frame 240, while occurring later in time during a video sequence, can be encoded before the B-frame 230, enabling the B-frame 230 to reference the I-frame 240. The I-frame 240 can store the complete picture or image. The B-frame 230 can reference the I-frame 240, as well as the P-frame 220.

The B-frame 230 can include an object 236, such as a fourth dot, which is included in the I-frame 240 but not the I-frame 210 or the P-frame 220. The object 236 can correspond to the object 246 included in the I-frame 240. The location of the object 236 in the B-frame 230 can be different than the location of the object 246 in the I-frame 240, such as further to the left in the B-frame 230 than in the I-frame 240. The changed location can be represented by a delta 237. The B-frame 230 can store the delta 237 representing the change of location of the object 236 in the B-frame 230 compared to the location of the object 246 in the I-frame 240. The B-frame 230 can reference the I-frame 240 explicitly by a stored reference identifier, or implicitly based on a protocol that specific frames in a sequence refer to other specific frames in the sequence.

As discussed above with respect to the object 214, 224, a technical problem of quantization combined with delta encoding is that errors due to compression and/or quantization can accumulate in successive frames. In a similar manner that accumulating errors can cause the object 214, 224, 234 to be located too far to the left, accumulating errors due to quantization of the I-frame 240 and B-frame 230 can cause the object 246, 236 to be located too far to the right. If the object 234 is located too far to the left, and the object 236 is located too far to the right, then the four dots represented by the objects 234, 236 may not appear to be consecutive, and/or an undesirably large gap can appear between the objects 234, 236 in the frame 230, resulting in an undesirable visual appearance.

Figure 3A:
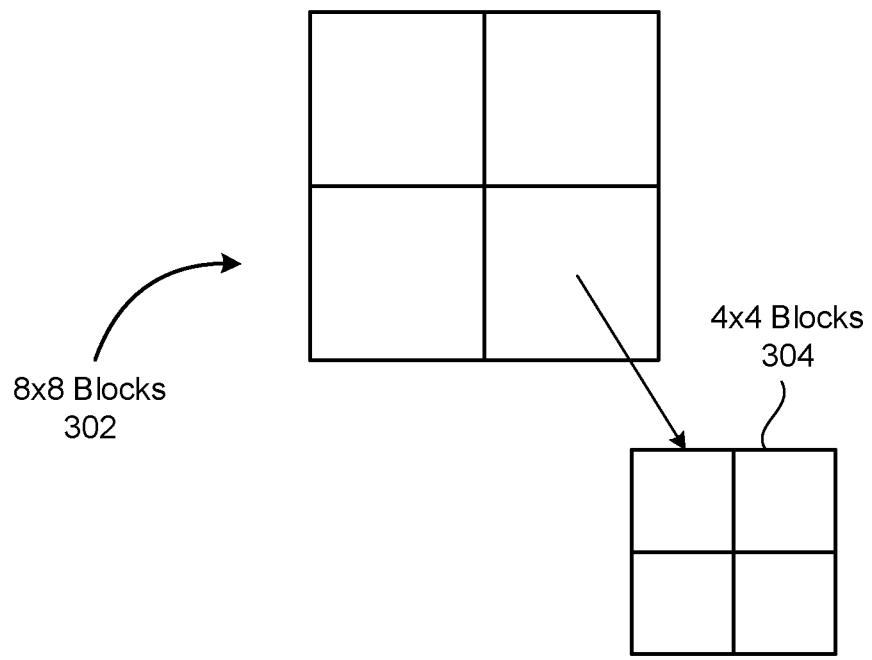
FIG. 3A shows four eight-by-eight blocks within a frame.

FIG. 3A shows four eight-by-eight blocks 302 within a frame. Frames can be divided and/or broken down into blocks, such as eight-by-eight blocks. In this example, one of the four eight-by-eight blocks is divided and/or broken down into four four-by-four blocks 304. Smaller blocks require more data, but enable delta encoding of changes to locations of smaller objects.

In some examples, a computing system can determine errors due to quantization on a block-by-block basis for individual blocks within a compressed frame. In some examples, the computing system can determine quantization levels and/or compression levels of specific blocks based on determined errors in corresponding blocks of previously encoded frames, such as by decreasing quantization levels and/or compression levels for a block based on determined errors for one or more corresponding blocks of one or more previously encoded frames exceeding an error threshold. In some examples, the computing system can determine block sizes based on determined errors due to quantization and/or compression of previously encoded frames. For example, the computing system can encode a frame with smaller blocks based on determining that the error due to quantization and/or compression of previously encoded frames is higher, and/or can encode a frame with larger blocks, such as a sixteen-by-sixteen block 352 shown in FIG. 3B, based on determining that the errors due to quantization and/or compression of previously encoded frames is lower.

Figure 3B:
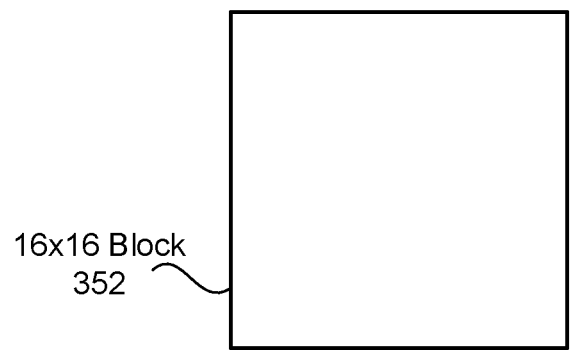
FIG. 3B shows a sixteen-by-sixteen block within a frame.

FIG. 3B shows a sixteen-by-sixteen block 352 within a frame. The frame with a sixteen-by-sixteen block 352 can store a larger object, such as a background object 212, 222, 232, 242, and/or can reduce the data required for the frame that includes the block 352 to represent the picture and/or image.

Figure 4:
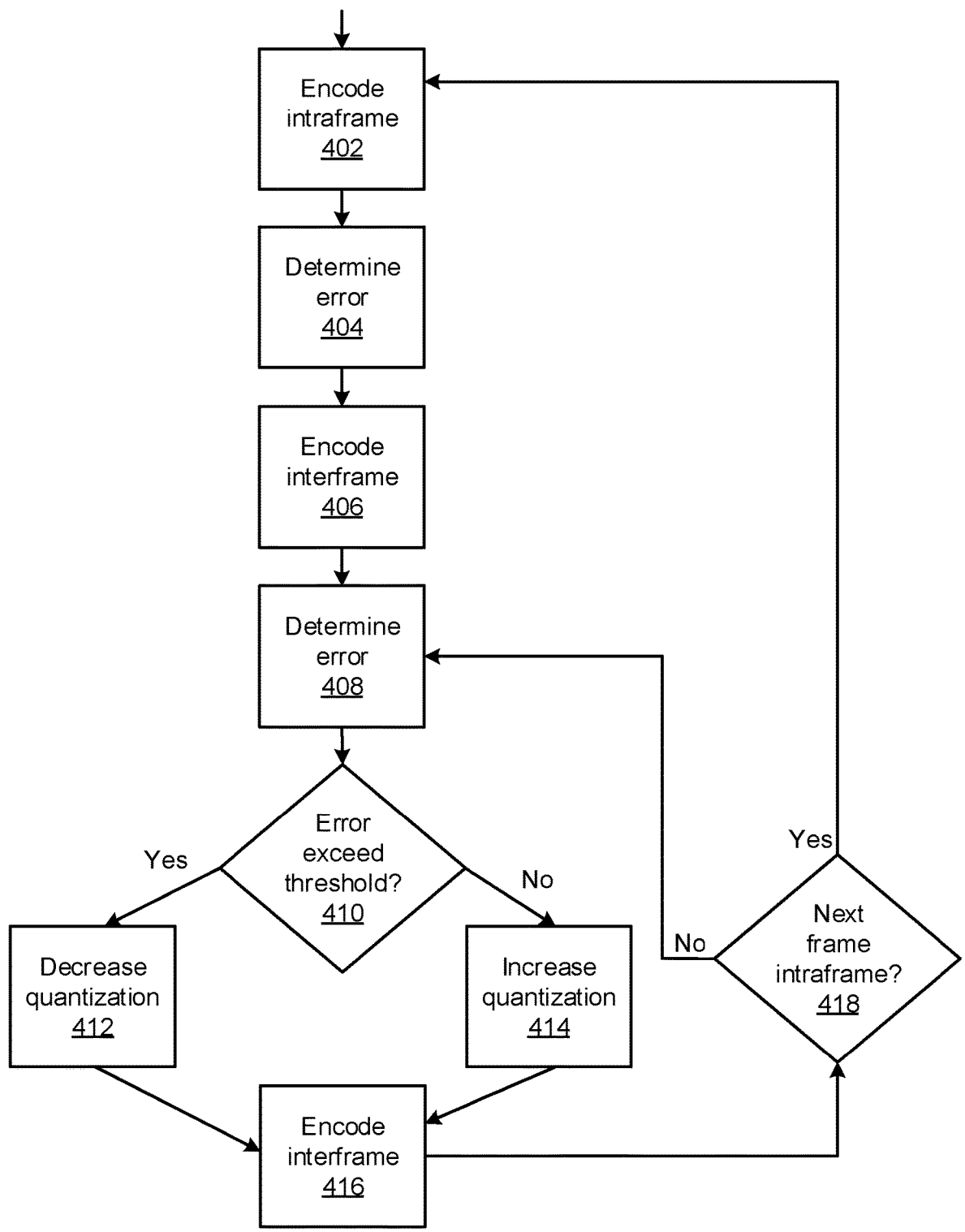
FIG. 4 is a flowchart showing a method of compressing frames based on errors of previous frames.

FIG. 4 is a flowchart showing a method of compressing frames based on errors of previous frames. In this example, the method can include encoding an intraframe (I-frame) (402), such as either of I-frames 210, 240. The method can be performed by a computing system that encodes a video stream. The encoding can include quantizing a first original frame of a video stream into a compressed intraframe. The quantizing can include using fewer symbols to represent values within the frame, such as by rounding the values or removing one or more least significant bits of the values. The compressed intraframe can have fewer symbols, and/or require less data to represent, than the first original frame.

The method can include determining an error of the intraframe (404). The error can be an error due to, and/or caused by, the compression and/or quantization of the intraframe. In some examples, the error can be determined by comparing quantized values in the intraframe to corresponding original values in the first original frame. An example of comparing the quantized values in the intraframe to corresponding values in the original frame is subtracting values in the intraframe from corresponding values in the original frame or subtracting values in the original frame from corresponding values in the intraframe, and/or determining a difference between at least one value, or multiple values, included in the original frame and at least one value or multiple values, such as a corresponding value(s), in the intraframe.

In some examples, the error can be based on a psychovisual difference and/or psychovisual error between the first original frame and the intraframe. The psychovisual difference and/or psychovisual error can be based on a predicted perceived difference between the first original frame and the intraframe. In some examples, the psychovisual difference and/or psychovisual error can model color perception and visual masking in the human visual system, such as by taking into account an understanding that the human eye images different colors with different levels of precision. The psychovisual difference and/or psychovisual error can be determined based, for example, on the butteraugli algorithm or structural similarity (S SIM) algorithm.

The method can include encoding a first interframe (406), such as a P-frame 220 or a B-frame 230. The encoding can include quantizing a second original frame of the video stream into a first compressed interframe. The first compressed interframe can reference the compressed intraframe. The first compressed interframe can have fewer symbols, and/or requires less data to represent, than the second original frame.

The method can include determining an error of the first interframe (408). The error can be an error due to, and/or caused by, the compression and/or quantization of the second original frame. The error can be determined by comparing quantized values in the first interframe to corresponding values in the original frame, as discussed above with respect to the intraframe, and/or based on a psychovisual difference as discussed above with respect to determining the error (404) of the intraframe. While FIG. 4 shows determining the error (404) of the intraframe before encoding the first interframe (406), the computing system can also determine the errors (404, 408) of the intraframe and first interframe after encoding the intraframe (402) and encoding the first interframe (406). In some examples, the determining the error (404, 408) can be performed on a block-by-block basis within each frame, and the error can be based on an error of a block which has a maximum error, greatest error, and/or highest error among blocks within the respective frame.

The encoding of the interframe (406) and determining the error (408) can be performed on any number of interframes. The computing system can determine a cumulative error based on the determined errors of the frames from which the next interframe encodes changes. A quantization level and/or compression level of a next interframe can be based on the cumulative error. In some examples, the computing system can determine the cumulative error based on which the quantization level and/or compression level of the next interframe will be determined based on all preceding frames from which the next interframe will encode changes, such as all other interframes that reference each other and/or one or more intraframes that are referenced by one of the preceding interframes from which the next interframe encodes changes. The cumulative error based on which the quantization level and/or compression level of the next interframe will be determined can be a function of the errors of the preceding frames, such as an average of the errors of the preceding frames or a greatest error of the preceding frames.

In some examples, the computing system can determine the quantization level and/or compression level by checking the determined error against a table and returning a quantization level and/or compression level based on the determined error. In some examples, the computing system can iteratively determine the quantization level and/or compression level iteratively by decreasing the quantization level (412) and/or compression level if the determined error exceeds an error threshold, and increasing the quantization level (414) and/or compression level if the determined error does not exceed a threshold. In some examples, the computing system can iteratively determine the compression level and/or quantization level by determining the quantization level and/or compression level of the subsequent frame, encoding the subsequent frame based on the determined quantization level and/or compression level, determining an error of the subsequent frame, and redetermining a compression level for the subsequent frame based on the determined error of the subsequent frame.

In some examples, the method can include determining whether an error based on errors of the intraframe(s) and any number of interframes exceeds an error threshold (410). The error can be based on any errors that a subsequent frame to be encoded will reference, or that is referenced by a frame that is referenced by a frame that the subsequent frame will reference, or which is referenced by any frame from which the subsequent frame to be encoded is encoding stores changes. In the example of FIG. 2, the error, based on which a quantization level and/or compression level for the second interframe/B-frame 230 will be determined, can be based on a determined error for the first interframe/P-frame 220, which the second interframe/B-frame 230 references, the first intraframe 210, which the first interframe/P-frame 220 references, and the second intraframe 240, which the second interframe/B-frame 230 references.

The determining whether the error(s) exceeds the threshold (410) can be based on a function of the errors of the preceding interframe(s) and intraframe(s), such as comparing an average error of the intraframe(s) and interframe(s), or based on a maximum error of the intraframe(s) and interframe(s). In some examples, the computing system can compare an average error of the frames, in a chain of references to an intraframe(s), to an error threshold. In some examples, the computing system can compare a highest error of the frames in the chain of references to an error threshold.

If the computing system determines that the error (based on either an average of the referenced frames or a highest error among referenced frames) exceeds the error threshold, then the computing system can decrease the quantization (412) and/or compression of the subsequent frame based on determining that the error exceeds the error threshold. The computing system can decrease the quantization (412) and/or compression of the subsequent frame by encoding the subsequent frame with a greater number of symbols than a previous frame and/or than an average number of symbols used to encode multiple previous frames. In some examples, the computing system can determine the greater number of symbols with which to encode the subsequent frame by multiplying the number of symbols with which the previous frame was encoded by a ratio of an error function to the error threshold. The error function can be based on the determined error, such as the average of the referenced frames or the highest error among referenced frames (in the example of FIG. 2, the error function can be based on any combination of the determined error of the first intraframe/I-frame 210, the first interframe/P-frame 220, and/or the second intraframe/I-frame 240). Encoding the subsequent frame with a greater number of symbols can reduce the error of the subsequent frame.

If the computing system determines that the error (based on either an average of the referenced frames or a highest error of the referenced frames) does not exceed the error threshold, and/or is less than the error threshold, then the computing system can increase the quantization (414) and/or compression of the subsequent frame based on determining that the error does not exceed the error threshold. The computing system can increase the quantization (412) and/or compression of the subsequent frame by encoding the subsequent frame with a lesser and/or lower number of symbols than a previous frame and/or than an average number of symbols used to encode multiple previous frames. In some examples, the computing system can determine the lesser and/or lower number of symbols with which to encode the subsequent frame by multiplying the number of symbols with which the previous frame was encoded by a ratio of the error threshold to an error function. The error function can be based on the determined cumulative error, such as the average of the referenced frames or the highest error among referenced frames (in the example of FIG. 2, the error function can be based on any combination of the determined error of the first intraframe/I-frame 210, the first interframe/P-frame 220, and/or the second intraframe/I-frame 240). Encoding the subsequent frame with a lesser number of symbols can reduce the data required to encode the subsequent frame.

After determining the quantization level and/or compression level, such as by decreasing the quantization level and/or compression level (412) or increasing the quantization level (414) and/or compression level, the computing system can encode the interframe (416).

After encoding an interframe (416), the computing system can determine whether a next original frame to be encoded is an intraframe (418). If the next original frame is to be encoded as an intraframe, then the computing system can encode the intraframe (402). The computing system can encode the intraframe independently of errors in previously encoded frames, and/or without determining errors of previously determined frames.

If the next original frame is not to be encoded as an intraframe, and/or is to be encoded as an interframe, then the computing system can determine an error (408) of a previously encoded frame, such as the interframe encoded at (416). The computing system can determine a quantization level and/or compression level for encoding the next original frame based on determined errors of previously encoded frames, as discussed above.

Figure 5:
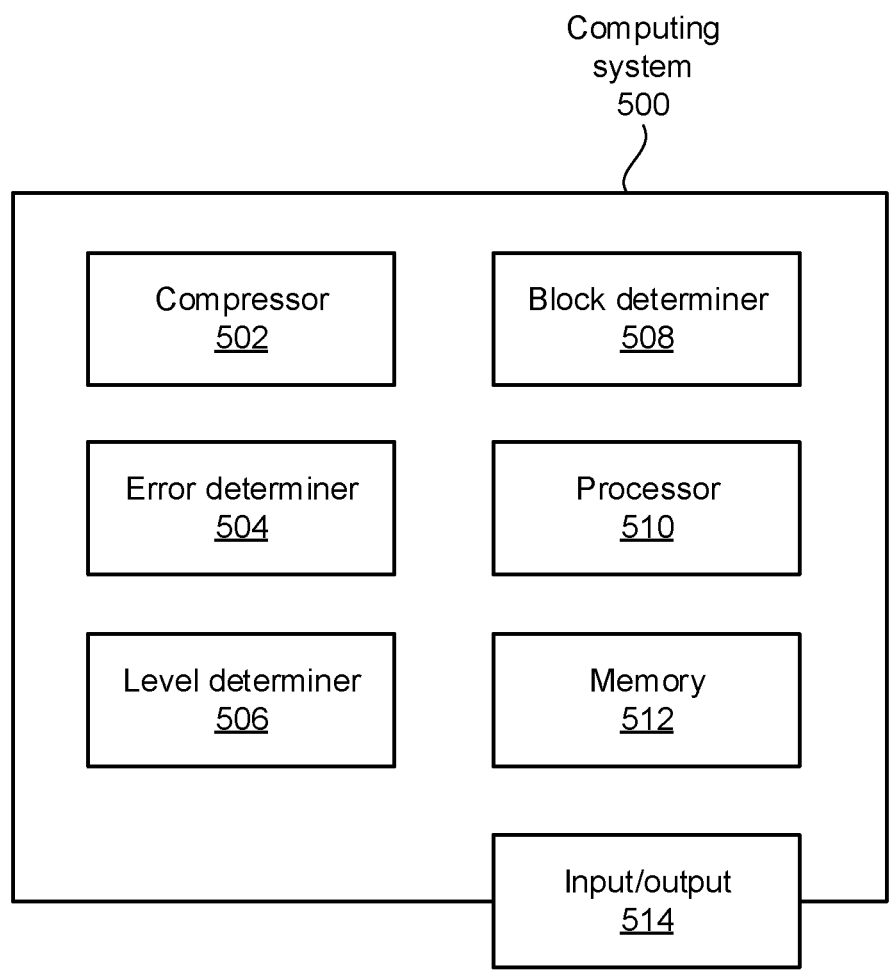
FIG. 5 shows a computing system that can compress frames based on errors of previous frames.

FIG. 5 shows a computing system 500 that can compress frames based on errors of previous frames. The computing system 500 can include a server, a desktop computer, a laptop or notebook computer, or any combination of multiple such computing devices. The computing system 500 can perform the method described above with respect to FIG. 4.

The computing system 500 can include a compressor 502. The compressor 502 can compress frames of a video stream. The compressing frames of the video stream by the compressor 502 can reduce a number of symbols required to represent each frame, and/or reduce an amount of data required to represent the video stream. The compressor 502 can compress frames of the video stream by delta encoding, by which some frames, such as interframes 220, 230 discussed above, store only changes to or from other frames. Storing only changes to or from other frames, rather than the entire picture or image represented by the frame, can have a technical benefit of reducing the amount of data needed to represent the frame.

The compressor 502 can also compress frames of the video stream by quantization. The quantization can include mapping values in an original frame from a large set of values to a smaller set of values. Examples of mapping values from the large set of values to the smaller set of values can include rounding the values or dropping least significant digits of the values, as non-limiting examples. Mapping values from the large set of values to the smaller set of values can have a technical benefit of reducing the amount of data needed to represent the values.

A size of the smaller set of values to which the large set of values in the original frame are mapped can be based on a level of compression and/or quantization for the frame. With less compression and/or quantization, the smaller set of values will be larger than with more compression and/or quantization, and the values will be represented more accurately, but more symbols will be required to represent the values and more data will be required to store the values. With more compression and/or quantization, the smaller set of values will be smaller than with less compression and/or quantization, and the values will be represented less accurately, but fewer symbols will be required to represent the values and less data will be required to store the values. A higher level of compression and/or quantization will result in a smaller set of values to which original values are mapped, saving more data but representing the values less accurately. A lower level of compression and/or quantization will result in a larger set of values to which original values are mapped, saving less data but representing the values more accurately.

The computing system 500 can include an error determiner 504. The error determiner 504 can determine errors of encoded frames due to quantization and/or compression. The error determiner 504 can determine errors of frames due to quantization and/or compression of multiple frames encoded, quantized, and/or compressed before a frame that is about to be encoded, quantized, and/or compressed. The error determiner 504 can determine errors of frames from which changes are encoded, in a chain ending at one or more intraframes that store the full picture or image. In some examples, the error determiner 504 can determine errors on a block-by-block basis within each frame, and the error can be based on an error of a block which has a maximum error, greatest error, and/or highest error among blocks within the respective frame.

In some examples, the error determiner 504 can determine an error of each encoded frame by comparing the quantized and/or compressed values to unquantized and/or original values. With delta encoding, the quantization can be performed after encoding an interframe as a frame that stores only changes from one or more preceding frames. The error due to quantization and/or compression can be based on the difference between the quantized values and the unquantized values representing changes from one or more preceding frames. In some examples, the error for a given frame can be based on a sum or average of the errors for any combination of some or all of the values stored in and/or represented by the quantized and/or compressed frame. In some examples, the error for a given frame can be based on a greatest error of values within a frame. In some examples, the error for a given frame can be based on a block within the given frame that has a greatest error among blocks within the frame.

In some examples, the error determiner 504 can determine an error of each encoded frame (and/or each block within an encoded frame) by determining a psychovisual difference and/or psychovisual error between the encoded frame and the original frame. The psychovisual difference and/or psychovisual error can determine a difference in visual appearance between the encoded frame and the original frame based on a model of the human visual system, such as by considering that the human visual system is more sensitive to low-frequency signals than to high-frequency signals. In some examples, the error determiner 504 can determine the psychovisual difference and/or psychovisual error between the encoded frame and the original frame by applying the butteraugli algorithm or the structural similarity (SSIM) algorithm.

In some examples, the error determiner 504 can determine an error based on an average error of previous and/or preceding frames from which a frame to be encoded stores changes. In some examples, the error determiner 504 can determine an error based on a greatest error of frames from which a frame to be encoded stores changes.

The computing system 500 can include a level determiner 506. The level determiner 506 can determine a quantization level and/or compression level for encoding a frame. The level determiner 506 can determine the quantization level and/or compression level for encoding the frame based on the error determined by the error determiner 504. The level determiner 506 can determine a maximum quantization level and/or compression level to minimize the data stored by a frame to represent a picture and/or image, while remaining within an acceptable error level. In some examples, the level determiner 506 can determine the quantization level and/or compression level by checking a table with errors and quantization levels and/or compression levels, as discussed above with respect to FIG. 4. In some examples, the level determiner 506 can iteratively increase or decrease the quantization level based on whether the determined error was within or exceeded an error threshold, as discussed above with respect to FIG. 4.

The computing system 500 can include a block determiner 508. The block determiner 508 can determine sizes of blocks within a frame, such as eight-by-eight blocks 302 or four-by-four blocks 304 shown in FIG. 3A, or sixteen-by-sixteen blocks 352 shown in FIG. 3B. The block determiner 508 can determine the sizes of the blocks based on the error determined by the error determiner 504.

In some examples, the block determiner 508 can determine that the frames should be encoded with larger blocks if the determined error is lower than a block threshold. The block determiner 508 can determine that the frames should be encoded with smaller blocks if the determined error is higher than a block threshold. In some examples, the block determiner 508 can determine that a block, such as an eight-by-eight block 302, should be encoded as smaller blocks, such as four-by-four blocks, based on a determined error of the specific block exceeding a block threshold.

The computing system 500 can include at least one processor 510. The at least one processor 510 may execute instructions, such as instructions stored in memory 512, to cause the computing system 500 to perform any combination of the methods, functions, or techniques described herein.

The computing system 500 may include at least one memory 512. The at least one memory 512 may include a non-transitory computer-readable storage medium. The at least one memory 512 may include instructions stored thereon that, when executed by the at least one processor 510, cause the computing system 500 to perform any combination of the methods, functions, or techniques described herein.

The computing system 500 may also include an input/output module 514. The input/output module 514 may include one or more input interfaces and one or more output interfaces. The input interfaces and output interfaces may include wired or wireless nodes for communicating with other computing systems, such as servers, or client-side computing systems that present the encoded frames, such as desktop computers, laptop or notebook computers, thin clients, netbooks, or smartphones, as non-limiting examples. The input interface(s) may include a keyboard, mouse, touchscreen, and/or microphone, as non-limiting examples. The output interface(s) may include a display and/or speaker, as non-limiting examples.

Figure 6:
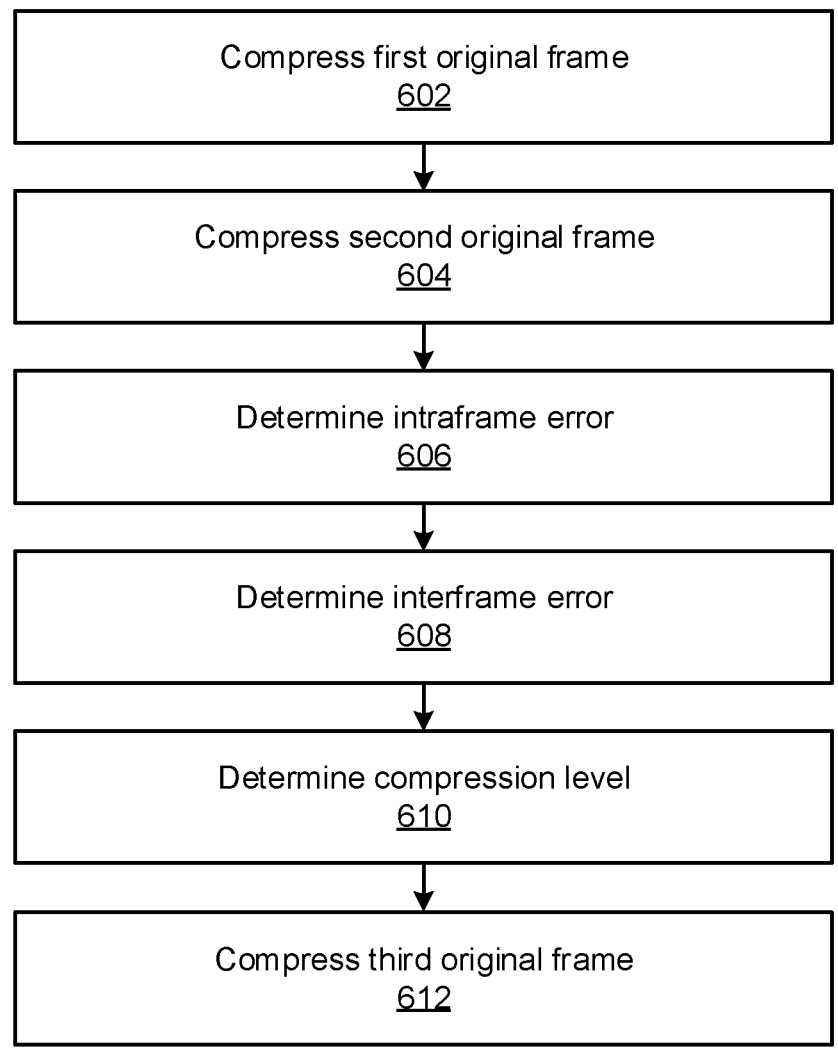
FIG. 6 is a flowchart showing a method of compressing frames based on errors of previous frames.

FIG. 6 is a flowchart showing a method of compressing frames based on errors of previous frames. The method can include compressing a first original frame (602) of a video stream to an intraframe. The intraframe can include fewer symbols than the first original frame. The method can include compressing a second original frame (604) of the video stream to a first interframe. The first interframe can reference the intraframe and comprising fewer symbols than the second original frame. The method can include determining an intraframe error (606) of the intraframe due to the compression of the first original frame. The method can include determining a first interframe error (608) of the first interframe due to the compression of the second original frame. The method can include determining a compression level (610) for a third original frame based on the intraframe error and the first interframe error. The method can include compressing the third original frame (612) of the video stream to a second interframe. The second interframe can reference the first interframe and include fewer symbols than the third original frame. A number of symbols included in the second interframe can be based on the determined compression level.

In some examples, the determining the intraframe error can include determining a difference between at least one value included in the first original frame and at least one value included in the intraframe.

In some examples, the determining the intraframe error can include determining a psychovisual difference between the first original frame and the intraframe.

In some examples, the determining the intraframe error can include determining a maximum error of multiple blocks within the first original frame and the intraframe.

In some examples, the determining the compression level can include determining that at least one of the intraframe error or the first interframe error exceeds an error threshold, and based on determining that at least one of the intraframe error or the first interframe error exceeds the error threshold, determining the compression level for the third original frame as a greater number of symbols than a number of symbols included in the first interframe.

In some examples, the determining the compression level can include determining that at least one of the intraframe error or the first interframe error is less than an error threshold, and based on determining that at least one of the intraframe error or the first interframe error is less than an error threshold, determining the compression level for the third original frame as a lower number of symbols than a number of symbols included in the first interframe.

In some examples, the intraframe does not reference any other frames.

In some examples, the determining the compression level for the third original frame can include determining the compression level for the third original frame based on the intraframe error, the first interframe error, an error threshold, and a number of symbols included in the first interframe.

In some examples, the determining the compression level for the third original frame can include multiplying a number of symbols included in the first interframe by a ratio of an error threshold to an error function. The error function can be based on the intraframe error and the first interframe error.

In some examples, the determining the compression level for the third original frame can include iteratively determining the compression level by determining a second interframe error of the second interframe and re-determining the compression level for the third original frame based on the determined second interframe error.

In some examples, the intraframe includes a Joint Photographic Experts Group (JPEG) frame.

In some examples, the second interframe references the first interframe and the intraframe.

In some examples, the intraframe includes a first intraframe, and the second interframe references the first interframe and a second intraframe.

Figure 7:
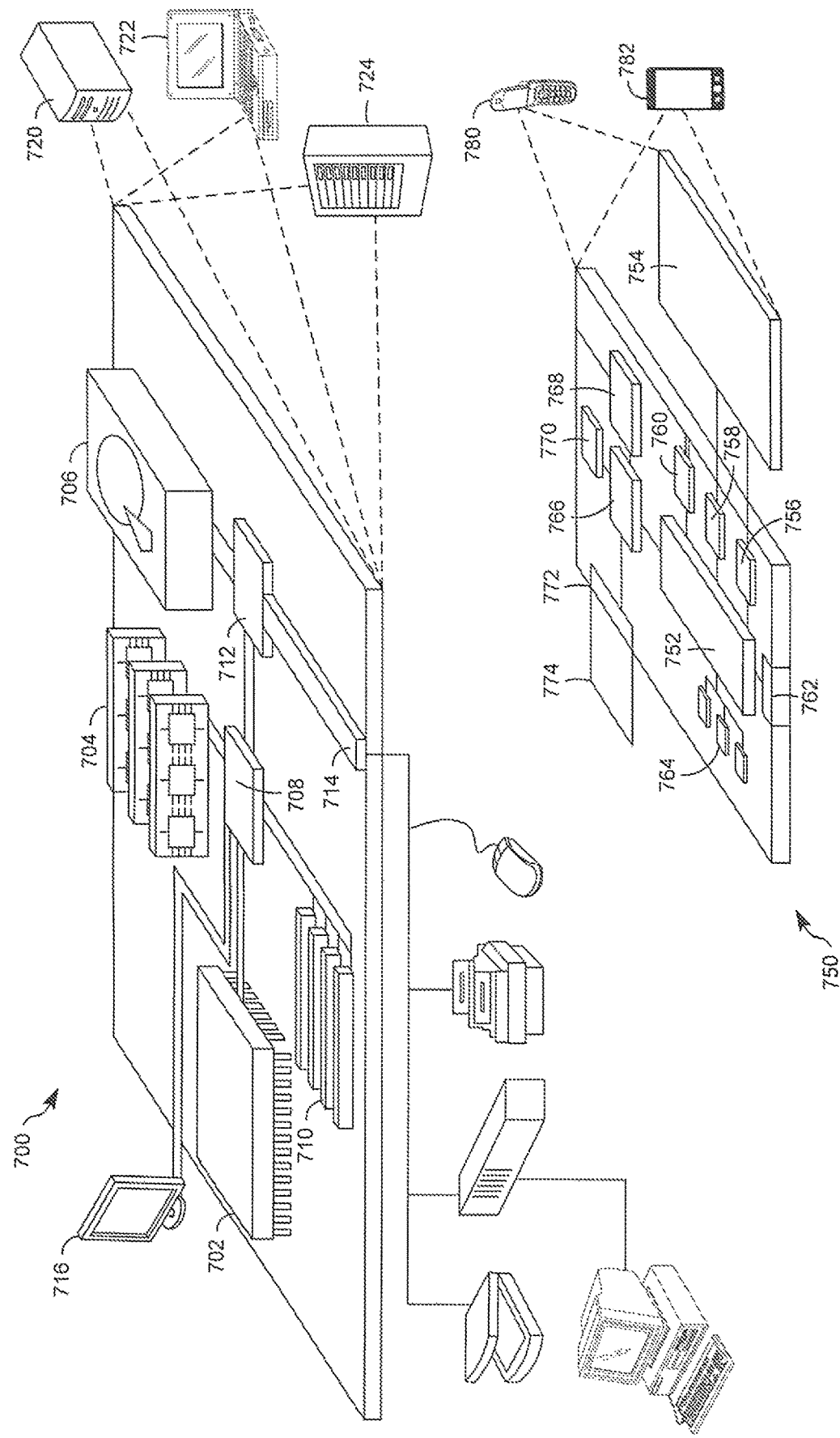
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various example embodiments are described below.

Example 1

A method comprising:
compressing a first original frame of a video stream to an intraframe, the intraframe comprising fewer symbols than the first original frame;
compressing a second original frame of the video stream to a first interframe, the first interframe referencing the intraframe and comprising fewer symbols than the second original frame;
determining an intraframe error of the intraframe due to the compression of the first original frame;
determining a first interframe error of the first interframe due to the compression of the second original frame;
determining a compression level for a third original frame based on the intraframe error and the first interframe error; and
compressing the third original frame of the video stream to a second interframe, the second interframe referencing the first interframe and comprising fewer symbols than the third original frame, a number of symbols included in the second interframe being based on the determined compression level.

Example 2

The method of example 1, wherein the determining the intraframe error includes determining a difference between at least one value included in the first original frame and at least one value included in the intraframe.

Example 3

The method of either of examples 1 or 2, wherein the determining the intraframe error includes determining a psychovisual difference between the first original frame and the intraframe.

Example 4

The method of either of examples 1 or 2, wherein the determining the intraframe error includes determining a maximum error of multiple blocks within the first original frame and the intraframe.

Example 5

The method of any of examples 1-4, wherein the determining the compression level includes:
determining that at least one of the intraframe error or the first interframe error exceeds an error threshold; and
based on determining that at least one of the intraframe error or the first interframe error exceeds the error threshold, determining the compression level for the third original frame as a greater number of symbols than a number of symbols included in the first interframe.

Example 6

The method of any of examples 1-5, wherein the determining the compression level includes:
determining that at least one of the intraframe error or the first interframe error is less than an error threshold; and
based on determining that at least one of the intraframe error or the first interframe error is less than an error threshold, determining the compression level for the third original frame as a lower number of symbols than a number of symbols included in the first interframe.

Example 7

The method of any of examples 1-6, wherein the intraframe does not reference any other frames.

Example 8

The method of any of examples 1-7, wherein the determining the compression level for the third original frame includes determining the compression level for the third original frame based on the intraframe error, the first interframe error, an error threshold, and a number of symbols included in the first interframe.

Example 9

The method of any of examples 1-8, wherein the determining the compression level for the third original frame includes multiplying a number of symbols included in the first interframe by a ratio of an error threshold to an error function, the error function being based on the intraframe error and the first interframe error.

Example 10

The method of any of examples 1-9, wherein the determining the compression level for the third original frame includes iteratively determining the compression level by determining a second interframe error of the second interframe and re-determining the compression level for the third original frame based on the determined second interframe error.

Example 11

The method of any of examples 1-10, wherein the intraframe includes a Joint Photographic Experts Group (JPEG) frame.

Example 12

The method of any of examples 1-11, wherein the second interframe references the first interframe and the intraframe.

Example 13

The method of any of examples 1-11, wherein: the intraframe includes a first intraframe; and the second interframe references the first interframe and a second intraframe.

Example 14

A non-transitory computer-readable storage medium comprising instructions stored thereon that, when executed by at least one processor, are configured to cause a computing system to perform the method of any of examples 1-13.

Example 15

A computing system comprising:
at least one processor; and
a non-transitory computer-readable storage medium comprising instructions stored thereon that, when executed by the at least one processor, are configured to cause the computing system to perform the method of any of examples 1-13.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   compressing a first original frame of a video stream to an intraframe, the intraframe comprising fewer symbols than the first original frame;
   compressing a second original frame of the video stream to a first interframe, the first interframe referencing the intraframe and comprising fewer symbols than the second original frame;
   determining an intraframe error of the intraframe due to the compression of the first original frame;
   determining a first interframe error of the first interframe due to the compression of the second original frame;
   determining a compression level for a third original frame based on at least one of:
   an average of the intraframe error and the first interframe error; or
   a greatest error of the intraframe error and the first interframe error; and
   compressing the third original frame of the video stream to a second interframe, the second interframe referencing the first interframe and comprising fewer symbols than the third original frame, a number of symbols included in the second interframe being based on the determined compression level.

2. The method of claim 1, wherein the determining the intraframe error includes determining a difference between at least one value included in the first original frame and at least one value included in the intraframe.

3. The method of claim 1, wherein the determining the intraframe error includes determining a psychovisual difference between the first original frame and the intraframe.

4. The method of claim 1, wherein the determining the intraframe error includes determining a maximum error of multiple blocks within the first original frame and the intraframe.

5. The method of claim 1, wherein the determining the compression level includes:
   determining that at least one of the intraframe error or the first interframe error exceeds an error threshold; and
   determining, based on determining that at least one of the intraframe error or the first interframe error exceeds the error threshold, the compression level for the third original frame as a greater number of symbols than a number of symbols included in the first interframe.

6. The method of claim 1, wherein the determining the compression level includes:
   determining that at least one of the intraframe error or the first interframe error is less than an error threshold; and
   determining, based on determining that at least one of the intraframe error or the first interframe error is less than the error threshold, the compression level for the third original frame as a lower number of symbols than a number of symbols included in the first interframe.

7. The method of claim 1, wherein the intraframe does not reference any other frames.

8. The method of claim 1, wherein the determining the compression level for the third original frame includes determining the compression level for the third original frame based on the intraframe error, the first interframe error, an error threshold, and a number of symbols included in the first interframe.

9. The method of claim 1, wherein the determining the compression level for the third original frame includes multiplying a number of symbols included in the first interframe by a ratio of an error function to an error threshold, the error function being based on the intraframe error and the first interframe error.

10. The method of claim 1, wherein the determining the compression level for the third original frame includes iteratively determining the compression level by determining a second interframe error of the second interframe and redetermining the compression level for the third original frame based on the determined second interframe error.

11. The method of claim 1, wherein:
   the intraframe includes a first intraframe; and
   the second interframe references the first interframe and a second intraframe.

12. The method of claim 1, wherein the determination of the compression level for the third original frame is based on the average of the intraframe error and the first interframe error.

13. The method of claim 1, wherein the determination of the compression level for the third original frame is based on the greatest error of the intraframe error and the first interframe error.

14. The method of claim 1, wherein the determining the first interframe error comprises comparing quantized values in the first interframe to corresponding values in the second original frame.

15. A non-transitory computer-readable storage medium comprising instructions stored thereon that, when executed by at least one processor, are configured to cause a computing system to:
compress a first original frame of a video stream to an intraframe, the intraframe comprising fewer symbols than the first original frame;
compress a second original frame of the video stream to a first interframe, the first interframe referencing the intraframe and comprising fewer symbols than the second original frame;
determine an intraframe error of the intraframe due to the compression of the first original frame;
determine a first interframe error of the first interframe due to the compression of the second original frame;
determine a compression level for a third original frame based on at least one of:
an average of the intraframe error and the first interframe error; or
a greatest error of the intraframe error and the first interframe error; and
compress the third original frame of the video stream to a second interframe, the second interframe referencing the first interframe and comprising fewer symbols than the third original frame, a number of symbols included in the second interframe being based on the determined compression level.

16. The non-transitory computer-readable storage medium of claim 15, wherein the second interframe references the first interframe and the intraframe.

17. The non-transitory computer-readable storage medium of claim 15, wherein the determining the compression level includes:
determining that at least one of the intraframe error or the first interframe error exceeds an error threshold; and
based on determining that at least one of the intraframe error or the first interframe error exceeds the error threshold, determining the compression level for the third original frame as a greater number of symbols than a number of symbols included in the first interframe.

18. A computing system comprising:
at least one processor; and
a non-transitory computer-readable storage medium comprising instructions stored thereon that, when executed by the at least one processor, are configured to cause the computing system to:
compress a first original frame of a video stream to an intraframe, the intraframe comprising fewer symbols than the first original frame;
compress a second original frame of the video stream to a first interframe, the first interframe referencing the intraframe and comprising fewer symbols than the second original frame;
determine an intraframe error of the intraframe due to the compression of the first original frame;
determine a first interframe error of the first interframe due to the compression of the second original frame;
determine a compression level for a third original frame based on at least one of:
an average of the intraframe error and the first interframe error; or
a greatest error of the intraframe error and the first interframe error; and
compress the third original frame of the video stream to a second interframe, the second interframe referencing the first interframe and comprising fewer symbols than the third original frame, a number of symbols included in the second interframe being based on the determined compression level.

19. The computing system of claim 18, wherein the determining the intraframe error includes determining a psychovisual difference between the first original frame and the intraframe.

20. The computing system of claim 18, wherein the determining the compression level includes:
determining that at least one of the intraframe error or the first interframe error exceeds an error threshold; and
based on determining that at least one of the intraframe error or the first interframe error exceeds the error threshold, determining the compression level for the third original frame as a greater number of symbols than a number of symbols included in the first interframe.

* * * * *